Figures 1, 2:
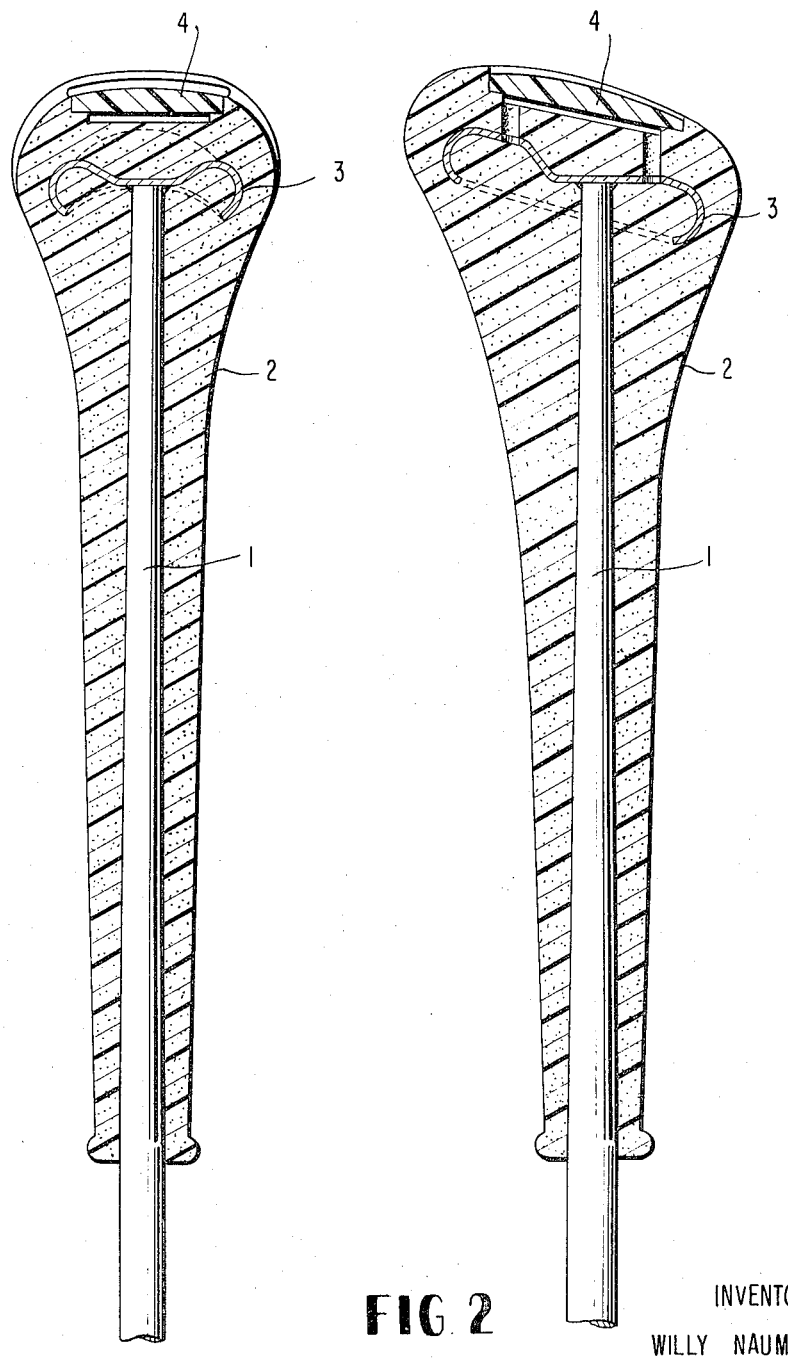

United States Patent

Naumann et al.

[15] 3,680,405
[45] Aug. 1, 1972

[54] SHIFTING LEVER FOR MOTOR VEHICLES TRANSMISSIONS

[72] Inventors: Willy R. Naumann, Plattenhardt; Wilhelm Albrecht, Vaihingen; Egon Wieland, Stuttgart, both of Germany

[73] Assignee: Daimler-Benz Aktiengesellschaft, Stuttgart-Unterturkheim, Germany

[22] Filed: Sept. 10, 1970

[21] Appl. No.: 71,179

[30]    Foreign Application Priority Data

Jan. 29, 1970   Germany.............P 20 03 873.7

[52] U.S. Cl......................74/523, 74/473 R, 74/543
[51] Int. Cl................................................G05g 1/06
[58] Field of Search ......74/543, 523, 473 R, 473 SW

[56]              References Cited

UNITED STATES PATENTS 3,561,281   2/1971   Wilfert.........................74/543 X
3,484,808   12/1969   Conterno.........................74/543

*Primary Examiner*—William F. O'Dea
*Assistant Examiner*—F. D. Shoemaker
*Attorney*—Craig, Antonelli and Hill

[57]             ABSTRACT

A shifting lever for a motor vehicle transmission which essentially consists of a metallic insert surrounded by a padding of foamed material and provided at its upper end with a plate deformable in case of impact thereagainst by a vehicle passenger.

5 Claims, 2 Drawing Figures

INVENTORS
WILLY NAUMANN
WILHELM ALBRECHT
EGON WIELAND

BY Craig, Antonelli, Stewart & Hill
ATTORNEYS

SHIFTING LEVER FOR MOTOR VEHICLES TRANSMISSIONS

The present invention relates to a shifting lever for the transmission of motor vehicles which is so constructed that the injury danger is at least strongly reduced in case of an essentially axial impact of a vehicle passenger against the shifting lever.

As solution to the underlying problems, a shifting lever for the transmission of motor vehicles is proposed which essentially consists of a metallic insert with a foamed material layer disposed about the same, whereby according to the present invention a foamed-in plate of relatively large surface extending in a horizontal plane or in a plane slightly inclined to the horizontal, is mounted on the upper end of the insert, which is deformable in case of impact of a vehicle passenger and whose edges are bent downwardly, preferably avoiding sharp bending places or kinks.

The plate may thereby be welded or threadably connected with the metallic insert.

Accordingly, it is an object of the present invention to provide a shifting lever for motor vehicle transmissions which avoids by simple means the aforementioned shortcomings and drawbacks encountered heretofore.

Another object of the present invention resides in a shifting lever for the transmission of motor vehicles which greatly increases the safety of the passengers against injuries in case of impact thereagainst.

A further object of the present invention resides in a shifting lever for a motor vehicle transmission of the type described above which is simple in construction, can be manufactured with simple as well as relatively inexpensive means, and is extraordinarily effective for the intended purposes.

These and other objects, features and advantages of the present invention will become more obvious from the following description when taken in connection with the accompanying drawing which shows for purposes of illustration only, one embodiment in accordance with the present invention, and wherein:

FIG. 1 is a longitudinal cross-sectional view through a shifting lever in accordance with the present invention, taken along line I—I of FIG. 2; and FIG. 2 is a longitudinal cross-sectional view, displaced at 90° to the cross-sectional view of FIG. 1, and taken along line II—II of FIG. 1.

Referring now to the drawing wherein like reference numerals are used throughout the two views to designate like parts, the shifting lever illustrated in the drawing essentially consists of a rod-like steel insert 1 which is surrounded by a layer of padding foamed material 2 of any conventional type. A plate 3 is mounted on the upper end of the steel insert 1 which consists, for example, of sheet metal and which is connected with the steel insert 1 by welding.

The edges of the plate 3 are thereby bent downwardly, avoiding sharp bending places or sharp angles in the bent down portions in order to avoid a damaging of the foamed material 2 and therewith an injury danger connected therewith.

A synthetic resinous material plate 4 is additionally mounted on the top of the handle member of the shifting lever which may show, for example, a firm symbol, such as its trademark, or the shifting diagram.

A shifting lever constructed in accordance with the present invention thus offers a large-surfaced padded impact surface so that the dangerous "spear" effect occurring with the shifting levers customary heretofore is eliminated.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What I claim is:

1. A shifting lever for the transmission of a motor vehicle which includes a metallic insert surrounded by a foamed material, characterized in that a plate with a relatively large surface and having edges which are bent downwardly with avoidance of sharp bending places is mounted on the upper end of the metallic insert which is deformable in case of impact of a vehicle passenger, said plate also being surrounded by said foamed material which forms a padding layer, said plate essentially consisting of sheet metal and being welded to the metallic insert.

2. A shifting lever for the transmission of a motor vehicle which includes a metallic insert surrounded by a foamed material, characterized in that a plate with a relatively large surface and having edges which are bent downwardly with avoidance of sharp bending places is mounted on the upper end of the metallic insert which is deformable in case of impact of a vehicle passenger, said plate also being surrounded by said foamed material which forms a padding layer, said plate being threadably connected with said metallic insert.

3. A shifting lever for the transmission of a motor vehicle which includes a metallic insert surrounded by a foamed material, characterized in that a plate with a relatively large surface and having edges which are bent downwardly with avoidance of sharp bending places is mounted on the upper end of the metallic insert which is deformable in case of impact of a vehicle passenger, said plate also being surrounded by said foamed material which forms a padding layer, said plate extending at most at a slight incline to the horizontal.

4. A shifting lever for the transmission of a motor vehicle which includes a metallic insert surrounded by a foamed material, characterized in that a plate with a relatively large surface is mounted on the upper end of the metallic insert which is deformable in case of impact of a vehicle passenger, said plate essentially consisting of sheet metal and being welded to the metallic insert.

5. A shifting lever for the transmission of a motor vehicle which includes a metallic insert surrounded by a foamed material, characterized in that a plate with a relatively large surface is mounted on the upper end of the metallic insert which is deformable in case of impact of a vehicle passenger, said plate being threadably connected with said metallic insert.

* * * * *